United States Patent [19]
Beers et al.

[11] Patent Number: 6,120,911
[45] Date of Patent: Sep. 19, 2000

[54] ZINC-RICH COATED STEEL ARTICLE

[75] Inventors: Roger Neil Beers, Uniontown; Thomas Walter Starinshak, Wadsworth; David Andrew Benko, Munroe Falls, all of Ohio

[73] Assignee: The Goodyear Tire & Rubber Company, Akron, Ohio

[21] Appl. No.: 08/926,125

[22] Filed: Sep. 9, 1997

[51] Int. Cl.[7] ..................................................... B32B 15/04
[52] U.S. Cl. ........................ 428/457; 152/451; 152/565; 156/910; 428/462; 428/465; 428/470; 428/625; 428/626; 428/658; 428/659
[58] Field of Search ..................................... 428/457, 462, 428/465, 470, 625, 626, 659, 658; 152/451, 565; 156/910

[56] References Cited

U.S. PATENT DOCUMENTS

| | | | |
|---|---|---|---|
| 2,605,201 | 7/1952 | Howe | 154/53 |
| 2,792,868 | 5/1957 | Benson | 152/357 |
| 3,802,478 | 4/1974 | Boustany et al. | 152/357 |
| 4,651,513 | 3/1987 | Dambre | 57/217 |
| 4,911,991 | 3/1990 | Van Ooij | 428/658 |

FOREIGN PATENT DOCUMENTS

| | | |
|---|---|---|
| 0039769 | 11/1981 | European Pat. Off. . |
| 039769 | 11/1981 | European Pat. Off. . |
| 0530445 | 3/1993 | European Pat. Off. . |
| 0669409 | 8/1995 | European Pat. Off. . |
| 49-041114 | 11/1974 | Japan . |

OTHER PUBLICATIONS

European Technical Report No. 46 entitled "Improved Adhesion of Rubber to Zinc–Coated Steel Cord for Conveyor Belting" (pre–1989).

European Technical Report No. 46 entitled "Improved Adhesion of rubber to Zinc–Coated Steel Cord for Conveyor Belting" (pre 1989).

K D Albrecht, Rubber Chemistry and Technology, pp. 981–998 (1973).

Derwent World Patents Index, 1987–1988; Zn–Co, Zn–Ni, Zn–Fe, Zn–Mn, Zn–Al, and Zn alloy coatings for adhesion to rubber or for use in Tires; Derwent patent abstracts.

*Primary Examiner*—Deborah Jones
*Assistant Examiner*—Robert R. Koehler
*Attorney, Agent, or Firm*—Bruce J Hendricks

[57] ABSTRACT

There is disclosed a zinc-rich coated steel article which is characterized by an outer layer of rubber containing a weight ratio of sulfur vulcanizing agent to total accelerator ranging from 0.4:1 to 0.8:1.

33 Claims, No Drawings

ZINC-RICH COATED STEEL ARTICLE

BACKGROUND OF THE INVENTION

Rubber composites (such as pneumatic tires, belts and hoses) commonly use brass-plated steel wires for reinforcement. Brass-plated steel wires have provided good results in general as regards to adhesion but has shown insufficient protection in respect to corrosion. It is known that, during vulcanization of the composite, the copper in the brass reacts with the available sulfur in the rubber and creates a thin layer of copper sulfide which forms an interface between the rubber and the wire therefore providing good initial adhesion of the rubber to the brass. Unfortunately, with aging of the rubber/copper bonding, there is a deterioration in the thin layer owing to a corrosion problem and loss of adhesion.

Efforts have been made to use zinc-coated wires because of its tendency to be more corrosion-resistant. Unfortunately, there is insufficient adhesion properties to rubber in many composite applications, such as tires. Therefore, there exists a need to improve the rubber to zinc-coated wire adhesion properties because prior attempts required very high amounts of cobalt salts or needed lead oxide and avoidance of such high levels of cobalt and use of lead oxide is preferred.

SUMMARY OF THE INVENTION

The present invention relates to a zinc-rich coated steel article encapsulated by an outer layer of rubber and rubber composites containing such encapsulated articles.

DETAILED DESCRIPTION OF THE INVENTION

There is disclosed a zinc-rich coated steel article which is characterized by an outer layer of a rubber compound wherein the compound comprises
  (a) 100 parts by weight of a rubber selected from the group consisting of natural rubber, synthetic rubber and mixtures thereof;
  (b) from 45 to 70 phr of carbon black;
  (c) from 0.5 to 3 phr of a sulfur donor selected from the group consisting of elemental sulfur, polymeric polysulfide, sulfur olefin adducts and mixtures thereof; and
  (d) from 1.25 to 3.75 phr of at least one accelerator; wherein the weight ratio of sulfur donor to total accelerator present in the wirecoat ranges from 0.4:1 to 0.8:1.

There is disclosed a zinc-rich coated steel wire encapsulated by a wirecoat compound, wherein said wirecoat compound comprises
  (a) 100 parts by weight of a rubber selected from the group consisting of natural rubber, synthetic rubber and mixtures thereof;
  (b) from 45 to 70 phr of carbon black;
  (c) from 0.5 to 3 phr of a sulfur donor selected from the group consisting of elemental sulfur, polymeric polysulfide, sulfur olefin adducts and mixtures thereof; and
  (d) from 1.25 to 3.75 phr of at least one accelerator; wherein the weight ratio of sulfur donor to total accelerator present in the wirecoat ranges from 0.4:1 to 0.8:1.

The present invention relates to a zinc-rich coated steel article. The term zinc-rich coated article is intended herein to include those articles having a radially outermost layer containing a zinc weight percentage ranging from about 85 to 100 percent by weight. Preferably, the zinc level of the outermost layer ranges from about 92 to 100 percent by weight. In those instances where it is elected not to use 100 percent zinc, other elements (such as nickel, cobalt and mixtures thereof) may be used to form zinc alloys. Use of such elements may further improve the corrosion resistance of the zinc-rich coated steel article. Therefore, conventional brass coatings (namely, a copper and zinc alloy containing, for example, 65 percent by weight copper and 35 percent zinc) is excluded from use of this invention. The amount of zinc coating on the steel article may vary. For example, from 3 to 70 grams of zinc per kilogram of steel article is deemed appropriate. Preferably, from 10 to 40 grams of zinc per kilogram of steel article is used.

Representative examples of such zinc-rich coated steel articles include a wire, plate, screen, beam, strip, nut, screw and clip. The preferred article is a wire.

The zinc coating may be electrodeposited, hot-dipped from molten materials or vacuum-deposited. The preferred coatings are electrodeposited from an acid zinc sulfate plating solution.

The steel substrate may be derived from those known to those skilled in the art. For example, the steel used for wire may be conventional tire cord rod including AISI grades 1070, 1080 and 1090. The steel may additionally contain varying levels of carbon and microalloying elements such as Cr, B, Ni and Co.

The coated zinc-plated wires of the present invention may be used in a cord. "Cord" means one or more of a reinforcing element, formed by one or more filaments or wires which may or may not be twisted or otherwise formed. Therefore, cords using the present invention may comprise from one (monofilament) to multiple filaments. The number of total filaments or wires in the cord may range from 1 to 134.

Preferably, the number of filaments or wires per cord ranges from 1 to 49.

The number of cord constructions which can contain one or more coated zinc steel wires are numerous. Representative examples of such cord constructions include 2x, 3x, 4x, 5x, 6x, 7x, 8x, 11x, 12x, 27x, 1+2, 1+3, 1+4, 1+5, 1+6, 1+7, 1+8, 1+14, 1+15, 1+16, 1+17, 1+18, 1+19, 1+20, 1+26, 2+1, 2+2, 2+5, 2+6, 2+7, 2+8, 2+9, 2+10, 2/2, 2/3, 2/4, 2/5, 2/6, 3+1, 3+2, 3+3, 3+4, 3x4, 3+6, 3x7, 3+9, 3/9, 3+9+15, 4x4, 5/8/14, 7x2, 7x3, 7x4, 7x7, 7x12, 7x19, 5+1, 6+1, 7+1, 8+1, 11+1, 12+1, 2+7+1, 1+4+1, 1+5+1, 1+6+1, 1+7+1, 1+8+1, 1+14+1, 1+15+1, 1+16+1, 1+17+1, 1+18+1, 1+19+1, 1+20+1, 2+2+8, 2+6+1, 2+7+1, 2+8+1, 2+9+1, 2+10+1, 2+2+8+1, 3+9+15+1, 27+1, 1+26+1, 7x2+1, 3+9+1, 3/9+1, 7x12+1 and 7x19+1. The filaments in the cord constructions may be preformed, waved or crimped. The preferred cord constructions include 2x, 3x, 1+5, 1+6, 1+18, 2+7 and 3/9+1.

The diameter of an individual wire or filament that is encapsulated or used in a cord that is encapsulated may range from about 0.08 to 0.5 mm. Preferably, the diameter ranges from 0.15 to 0.35 mm.

Each individual zinc-rich coated steel wire or filament may be encapsulated by the above-described wire coat or a plurality of zinc-rich coated wires or filaments may be twisted to form one of the above cords and then encapsulated with the above-described wirecoat. In accordance with another embodiment, zinc-rich coated wires may be twisted or formed into cords containing steel wires which are plated with another metal other than zinc.

The rubber compound that encapsulates the zinc-rich coated steel article may contain natural rubber. The natural rubber includes its various forms, e.g., pale crepe and smoked sheet, and balata and gutta percha. The rubber may be solely natural rubber, a blend of natural rubber and synthetic rubber or solely synthetic rubber. The synthetic polymers are derived from a diene monomer and include those prepared from a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3-butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butyl acrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50 percent by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene. The rubber may be emulsion polymerized or solution polymerized.

The preferred synthetic rubbers which may be used with the present invention are cis-1,4-polyisoprene, polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof. Since the compounds of the present invention are used as a wire coat composition, natural rubber is preferably present and may even be partially replaced with some synthetic rubber. When used as a blend, the natural rubber is preferably present in an amount ranging from 5 to 95 weight percent of the total rubber present in the wire coat compound.

Throughout this specification and claims, the term "phr" is found. PHR is used herein to describe parts by weight per 100 parts by weight of total rubber in the compound.

Carbon black is present in the rubber compound or wirecoat for use in the present invention. Representative carbon blacks include N326, N330, N347, N550, N630, N642, N660, N754, N762, N765 and N990. The preferred carbon blacks are N326, N347 and N550. The total amount of carbon black may vary. Generally speaking, the amount of carbon black ranges from 45 to 70 phr. Preferably, the amount of carbon black ranges from 50 to 65 phr.

In order to cure the rubber compound or wire coat, one needs to have a sulfur donor. Examples of suitable sulfur donors or vulcanizing agents include elemental sulfur (free sulfur) or a sulfur donating vulcanizing agent, for example, polymeric polysulfide, sulfur olefin adducts and mixtures thereof. Preferably, the sulfur donor or vulcanizing donor is elemental sulfur in the insoluble form. The amount of sulfur vulcanizing donor may vary. The sulfur donor is generally present in an amount ranging from about 0.5 to about 3 phr. Preferably, the sulfur donor is present in an amount ranging from about 0.75 phr to about 1.5 phr.

Accelerators are used to control the time and/or temperature required for vulcanization and to improve the properties of the rubber compound or wirecoat. In one embodiment, a single accelerator system may be used; i.e., primary accelerator. In another embodiment, combinations of a primary accelerator and a secondary accelerator might be used with the secondary accelerator being used in a smaller, equal or greater amount to the primary accelerator. In addition, delayed action accelerators may be used in combination with the primary accelerator which are not affected by normal processing temperatures but produce a satisfactory cure at ordinary vulcanization temperatures. Suitable types of accelerators that may be used include sulfenamides, sulfenimides, amines, disulfides, guanidines, thioureas, thiazoles, thiurams, dithiocarbamates and xanthates. Preferred primary accelerators are sulfenamides and sulfenimides. If a second accelerator is used, the secondary accelerator is preferably a guanidine, dithiocarbamate or thiuram compound.

The accelerator compound is an essential component of the rubber compound or wirecoat used in the present invention. The accelerator is generally present in an amount of from about 1.25 to 3.75 phr. Preferably, the accelerator is present in an amount ranging from about 1.4 to about 3.0 phr.

The weight ratio of sulfur donor to total accelerator present in the wirecoat will vary. Total accelerator means herein the total phr of any primary accelerator when used alone or the total phr of primary and secondary accelerator when used. Generally speaking, the weight ratio of sulfur donor to total accelerator that is present in the wirecoat ranges from 0.4:1 to 0.8:1. Preferably, the weight ratio ranges from 0.42:1 to 0.72:1.

Representative sulfenamides are of the general formula:

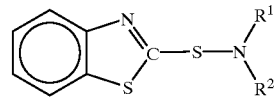

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

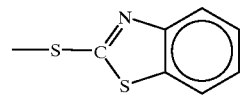

Representative of the above sulfenamide compounds and which may be used in the present invention include N-cyclohexyl-2-benzothiazylsulfenamide, N-t-butyl-2-benzothiazylsulfenamide, N,N-dicyclohexyl-2-benzothiazylsulfenamide, N-isopropyl-2- benzothiazylsulfenamide and N-t-butylbis-(2-benzothiazylsulfen)amide. Preferably, the sulfenamide compound is N-t-butyl-2-benzothiazylsulfenamide.

A representative example of a sulfenimide compound is N-tertiary-butyl-2-benzothiazole sulfenimide which is commercially available from Monsanto under the designation Santocure® TBSI.

In situ resins may be formed in the rubber compound or wirecoat stock used in the present invention. In situ resins involve the reaction of a methylene acceptor and a methylene donor. The term "methylene donor" is intended to mean a compound capable of reacting with a methylene acceptor and generate the resin in situ. Examples of methylene donors which are suitable for use in the present invention include hexamethylenetetramine, hexamethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified and polymers of formaldehyde such as paraformaldehyde. In addition, the methylene donors may be N-substituted oxymethylmelamines, of the general formula:

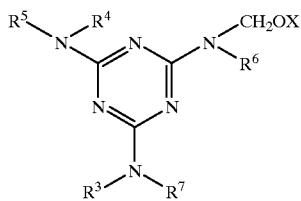

wherein X is an alkyl having from 1 to 8 carbon atoms, $R^3$, $R^5$, $R^5$, $R^6$ and $R^7$. are individually selected from the group consisting of hydrogen, an alkyl having from 1 to 8 carbon atoms, the group —$CH_2OX$ or their condensation products. Specific methylene donors include hexakis-(methoxymethyl)melamine, N,N',N"-trimethyl/N,N',N"-trimethylolmelamine, hexamethylolmelamine, N-methylolmelamine, N,N'-dimethylolmelamine, N,N',N"-tris(methoxymethyl)melamine and N,N'N"-tributyl-N,N', N"-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

Examples of methylene acceptors include activated phenols by ring substitution and a cashew nut oil modified novalak-type phenolic resin. Representative examples of activated phenols by ring substitution include resorcinol, cresols, t-butyl phenols, isopropyl phenols, ethyl phenols and mixtures thereof. Cashew nut oil modified novalak-type phenolic resins are commercially available from Schenectady Chemicals Inc under the designation SP6700. The modification rate of oil based on total novalak-type phenolic resin may range from 10 to 50 percent. For production of the novolak-type phenolic resin modified with cashew nut oil, various processes may be used. For example, phenols such as phenol, cresol and resorcinol may be reacted with aldehydes such as formaldehyde, paraformaldehyde and benzaldehyde using acid catalysts. Examples of acid catalysts include oxalic acid, hydrochloric acid, sulfuric acid and p-toluenesulfonic acid. After the catalytic reaction, the resin is modified with the oil.

The amount of methylene acceptor that is present in the rubber stock may vary. Typically, the amount of methylene acceptor that is present will range from about 0.1 phr to 10 phr. Preferably, the amount of methylene acceptor ranges from about 2.0 phr to 5.0 phr.

Conventional rubber additives may be incorporated in the rubber stock used in the present invention. The additives commonly used in rubber stocks include fillers, plasticizers, waxes, processing oils, retarders, antiozonants, antioxidants and the like. The total amount of filler (other than carbon black as described above) that may be used may range from about 30 to about 150 phr, with a range of from about 45 to about 100 phr being preferred. Fillers include clays, calcium carbonate, calcium silicate and titanium dioxide. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, pentachlorophenol, saturated and unsaturated hydrocarbons and nitrogen bases, coal tar products, cumarone-indene resins and esters such as dibutyl phthalate and tricresol phosphate. Common waxes which may be used include paraffinic waxes and microcrystalline blends. Such waxes are used in amounts ranging from about 0.5 to 3 phr. Materials used in compounding which function as an accelerator-activator includes metal oxides such as zinc oxide and magnesium oxide which are used in conjunction with acidic materials such as fatty acid, for example, stearic acid, oleic acid and the like. The amount of the metal oxide may range from about 1 to about 14 phr with a range of from about 2 to about 8 phr being preferred. The amount of fatty acid which may be used may range from about 0 phr to about 5.0 phr with a range of from about 0 phr to about 2 phr being preferred.

The rubber compounds of the present invention may also contain a cure activator. A representative cure activator is methyl trialkyl ($C_8$–$C_{10}$) ammonium chloride commercially available under the trademark Adogen® 464 from Sherex Chemical Company of Dublin, Ohio. The amount of activator may be used in a range of from 0.05 to 5 phr.

Siliceous pigments may be used in the rubber compound used in the present invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate. Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930). The silica may also be typically characterized by having a dibutyl phthalate (DBP) absorption value in a range of about 100 to about 400, and more usually about 150 to about 300. The silica might be expected to have an average ultimate particle size, for example, in the range of 0.01 to 0.05 micron as determined by the electron microscope, although the silica particles may be even smaller, or possibly larger, in size. Various commercially available silicas may be considered for use in this invention such as, only for example herein, and without limitation, silicas commercially available from PPG Industries under the Hi-Sil trademark with designations 210, 243, etc; silicas available from Rhone-Poulenc, with, for example, designations of Z1165MP and Z165GR and silicas available from Degussa AG with, for example, designations VN2 and VN3, etc. Generally speaking, the amount of silica may range from 5 to 120 phr. Since the intended use of the present invention is as a wire coat compound, the silica will generally range from about 0 to 30 phr.

A class of compounding materials known as scorch retarders may be used. Phthalic anhydride, salicylic acid and N-cyclohexyl thiophthalimide are known retarders. Retarders may be used in an amount ranging from about 0 to 0.5 phr.

Conventionally, antioxidants and sometimes antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, paraphenylenediamines, quinolines and mixtures thereof. Specific examples of such antidegradants are disclosed in The Vanderbilt Rubber Handbook (1990), pages 282–286. Antidegradants are generally used in amounts from about 0.25 to about 5.0 phr with a range of from about 0.75 to about 3.0 phr being preferred.

The rubber compound, and especially when used as a wirecoat compound, may contain any of the cobalt materials known in the art to promote the adhesion of rubber to metal. Thus, suitable cobalt materials which may be employed include cobalt salts of fatty acids such as stearic, palmitic, oleic, linoleic and the like; cobalt salts of aliphatic or alicyclic carboxylic acids having from 6 to 30 carbon atoms, such as cobalt neodecanoate; cobalt chloride, cobalt naphthenate; cobalt carboxylate and an organo-cobalt-boron complex commercially available under the designation Manobond C from Wyrough and Loser, Inc, Trenton, N.J. Manobond C is believed to have the structure:

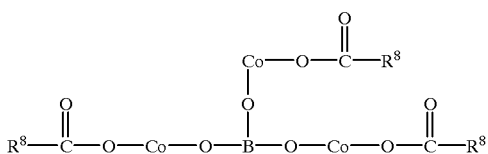

in which $R^8$ is an alkyl group having from 9 to 12 carbon atoms.

Amounts of organo-cobalt compound which may be employed depend upon the specific nature of the cobalt material selected, particularly the amount of cobalt metal present in the compound.

The amount of the cobalt material may range from about 0.2 to 5 phr. Preferably, the amount of cobalt compound may range from about 0.5 to 3 phr. When used, the amount of cobalt material present in the stock composition should be sufficient to provide from about 0.01 percent to about 0.50 percent by weight of cobalt metal based upon total weight of the rubber stock composition with the preferred amounts being from about 0.03 percent to about 0.2 percent by weight of cobalt metal based on total weight of skim stock composition.

The mixing of the rubber compound can be accomplished by methods known to those having skill in the rubber mixing art. For example, the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The sulfur donor and accelerator(s) are generally mixed in the productive mix stage. The terms "non-productive" and "productive" mix stages are well known to those having skill in the rubber mixing art.

As can be appreciated by one skilled in the art, the zinc-rich coated steel article encapsulated by the rubber compound may be used in a number of assembled products. Such products include tank tread pads, automotive components, engine components and the like.

The encapsulated zinc-coated steel wire can be used in a hose, belts and, in particular, tires. Such pneumatic tires can be built, shaped, molded and cured by various methods which are known and will be readily apparent to those having skill in such art. As can be appreciated, the tire may be a passenger tire, truck tire and the like.

In those instances where the wire of the present invention is used in a cord which is incorporated into a tire, the cord may be used in a belt structure, bead or carcass. "Belt structure" means at least two layers of plies of parallel cords, underlying the tread, unanchored to the bead and having both left and right cord angles in the range from about 17 to about 27 degrees with respect to the equatorial plane (EP) of the tire. "Carcass" means the tire structure apart from the belt structure, the tread and the undertread but including the beads. The carcass ply includes reinforcing cords embedded in an elastomeric substance and that these components are considered to be a single entry.

The present invention may be better understood by reference to the following examples in which the parts or percentages are by weight unless otherwise indicated.

Cure properties were determined using a Monsanto oscillating disc rheometer which was operated at a temperature of 150° C. and 100 cycles per minute. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained for the rubber stocks that were prepared. These properties include a torque minimum (Min. Torque), a torque maximum (Max. Torque), minutes to 25 percent of the torque increase (t25) and minutes to 90 percent of the torque increase (t90).

Adhesion testing was done to determine the interfacial adhesion between the rubber formulations that were prepared. The interfacial adhesion was determined by pulling one compound from another at a right angle to the untorn test specimen with the two right ends being pulled apart at a 180° angle to each other using an Instron machine. The area of contact was determined from placement of a Mylar™ sheet between the compounds during cure. A window in the Mylar™ allowed the materials to come into contact with each other during testing.

Standard wire adhesion tests (SWAT) were conducted by embedding a single zinc-plated cord in the respective rubber compositions. The rubber articles were then cured at 150° C. for 28 minutes. The zinc-plated steel cord in these rubber compositions were then subjected to a pull-out test, according to ASTM Standard D2229-73. The results of these pull-out tests (SWAT) and rubber coverage are given below and identified as Original in Table II and expressed in Newtons. Adhesion tests were also conducted on the rubber articles after curing and then subjecting the cured samples to (1) 4 days in 5 percent by weight aqueous sodium chloride solution at 90° C. and (2) 4 days in a steam autoclave at 100° C.

In the following examples, all parts are parts by weight per 100 parts by weight of total rubber (phr).

EXAMPLE 1

A series of four rubber compounds were prepared and contained the ingredients as shown in Table 1. Each sample was tested for its physical properties which are listed in Table 2 alongside the level of silica used and whether the steel cord was brass-plated or zinc-plated.

TABLE 1

| Sample No. | 1 | 2 | 3 | 4 |
|---|---|---|---|---|
| First Nonproductive | | | | |
| Natural Rubber | 50 | 50 | 50 | 50 |
| Cis-1,4-polyisoprene | 50 | 50 | 50 | 50 |
| Carbon Black | 60 | 60 | 60 | 60 |
| Peptizer | 0.05 | 0.05 | 0.05 | 0.05 |
| Cobalt Neodecanoate | 2 | 2 | 2 | 2 |
| Zinc Oxide | 5 | 5 | 5 | 5 |
| Naval Stores Rosin Acid | 2 | 2 | 2 | 2 |
| Oleic Acid | 2 | 2 | 2 | 2 |
| Phenol-Formaldehyde Resin | 2 | 2 | 2 | 2 |
| Second Nonproductive | | | | |
| Silica | 0 | 5 | 10 | 15 |
| Diaryl-p-phenylenediamine | 0.75 | 0.75 | 0.75 | 0.75 |
| Productive | | | | |
| Cashew Nut Oil Modified Novalak-Type Phenolic Resin | 2 | 2 | 2 | 2 |
| Hexamethoxymethylmelamine | 2.8 | 2.8 | 2.8 | 2.8 |
| Mercaptobenzothiazole Disulfide | 0.3 | 0.3 | 0.3 | 0.3 |
| N-tert-butyl-2-benzothiazole Sulfenimide | 1.8 | 1.8 | 1.8 | 1.8 |
| Zinc Oxide | 3.0 | 3.0 | 3.0 | 3.0 |
| Sulfur | 1.0 | 1.0 | 1.0 | 1.0 |

TABLE 2

| Pull Out Force (Newtons)/Rubber Coverage (%) for 7 × 7 × 0.22 + 1 × 0.15 Cord | | | | |
|---|---|---|---|---|
| Coating | Sample 1 | Sample 2 | Sample 3 | Sample 4 |
| Original Adhesion | | | | |
| Zinc | 632/12 | 1001/90 | 964/85 | 997/90 |
| Brass | 652/10 | 701/10 | 743/10 | 704/10 |
| Salt Water Aged 4 Days | | | | |
| Zinc | 739/30 | 926/80 | 1000/95 | 1007/95 |
| Brass | 496/0 | 553/0 | 613/0 | 614/0 |
| Steam Aged 4 Days | | | | |
| Zinc | 409/15 | 582/43 | 666/60 | 962/95 |
| Brass | 378/0 | 375/0 | 436/0 | 599/0 |

It can be readily seen that the zinc-plated cord had enhanced pullout force and rubber coverage compared to the brass-plated cord. When the level of silica was increased, increased performance was achieved in the zinc-plated cord.

EXAMPLE 2

A series of four rubber compounds were prepared and contained the ingredients as shown in Table 3. The series of samples were prepared to measure the importance of varying the weight ratio of sulfur to accelerator. Each sample was tested for its physical properties which are listed in Table 4 alongside the level of accelerator used, weight ratio of sulfur to accelerator and whether the steel cord was brass-plated or zinc-plated.

The cord constructions are listed in Table 4.

TABLE 3

| First Nonproductive | |
|---|---|
| Natural Rubber | 50 |
| Cis-1,4-polyisoprene | 50 |
| Carbon Black | 60 |
| Peptizer | 0.05 |
| Cobalt Neodecanoate | 2 |
| Zinc Oxide | 5 |
| Naval Stores Rosin Acid | 2 |
| Oleic Acid | 2 |
| Phenol-Formaldehyde Resin | 2 |
| Second Nonproductive | |
| Diaryl-p-phenylenediamine | 0.75 |
| Productive | |
| Resorcinol | 2 |
| Hexamethoxymethylmelamine | 2.8 |
| Mercaptobenzothiazole Disulfide | Varied |
| N-tert-butyl-2-benzothiazole Sulfenimide | Varied |
| Zinc Oxide | 3.0 |
| Sulfur | Varied |

TABLE 4

| Sample No. | 1 | 2 | 3 | 4 | 5 |
|---|---|---|---|---|---|
| Mercaptobenzothiazole Disulfide | 0.25 | 0.2 | 0.3 | 0.3 | 0.4 |
| N-tert-butyl-2-benzothiazole Sulfenimide | 1.25 | 1.2 | 1.5 | 1.8 | 2.4 |
| Sulfur | 1.5 | 1.0 | 1.0 | 1.0 | 1.0 |
| Sulfur: Accelerator Weight Ratio | 1:1 | 0.71:1 | 0.55:1 | 0.48:1 | 0.36:1 |
| Original Adhesion (Actual) | | | | | |
| Zinc-Coated Steel Wire (N) | 287 | | 269 | 315 | 463 |
| Brass-Coated Steel Wire (N) | 349 | | 285 | 251 | 540 |
| Original Adhesion* (Normalized) | | | | | |
| Zinc-Coated Steel Wire | 82 | 99 | 94 | 125 | 85 |
| Brass-Coated Steel Wire | 100 | 100 | 100 | 100 | 100 |
| Cord Construction | 2 + 2x.22 | 2 + 2x.22 | 2 + 2X.22 | 2 + 2x.22 | 7 × 7x.22 + 1x.15 |

*Normalized to brass-coated steel wire values

As can be seen from the Adhesion values for the above samples, use of a sulfur:accelerator ratio below 0.4:1 and above 0:8:1 result in inferior properties.

EXAMPLE 3

A series of seven different plated steel cords were tested for adhesion values in the rubber compound of Table 5. Table 6 lists the type of plating on the steel cord as well as the original adhesion value in expressed in Newtons. The cord was 2+2×0.22 construction.

TABLE 5

| First Nonproductive | |
|---|---|
| Natural Rubber | 50 |
| Cis-1,4-polyisoprene | 50 |
| Carbon Black | 60 |
| Peptizer | 0.05 |
| Cobalt Neodecanoate | 2 |
| Zinc Oxide | 5 |
| Naval Stores Rosin Acid | 2 |
| Oleic Acid | 2 |
| Phenol-Formaldehyde Resin | 2 |
| Second Nonproductive | |
| Silica | 10 |
| Diaryl-p-phenylenediamine | 0.75 |
| Productive | |
| Cashew Nut Oil Modified Novalak-type Phenolic Resin | 2 |
| Hexamethoxymethylmelamine | 2.8 |
| Mercaptobenzothiazole Disulfide | 0.3 |
| N-tert-butyl-2-benzothiazole Sulfenimide | 1.8 |
| Zinc Oxide | 3.0 |
| Sulfur | 1.0 |

TABLE 6

| Plating | Adhesion Value (N) |
|---|---|
| Brass | 251 |
| Cobalt | 66 |
| Zinc | 315 |
| Ni/Zn (90/10)* | 59 |
| Cobalt/Zn (99/1)* | 59 |
| Cobalt/Zn (8/92)* | 307 |
| Copper | 125 |

*by weight

The above data illustrates that the wirecoat of Table 5 when used with a zinc-rich coated steel wire has superior properties versus those coated steel wires having less than 90 percent by weight of zinc.

What is claimed is:

1. A zinc-rich coated steel article encapsulated by a rubber compound, wherein said rubber compound comprises
   (a) 100 parts by weight of a rubber selected from the group consisting of natural rubber, synthetic rubber and mixtures thereof;
   (b) from 45 to 70 phr of carbon black;
   (c) from 0.5 to 3 phr of a sulfur donor selected from the group consisting of elemental sulfur, polymeric polysulfide, sulfur olefin adducts and mixtures thereof,
   (d) from 1.25 to 3.75 phr of at least one accelerator; wherein the weight ratio of sulfur donor to total accelerator present in the wirecoat ranges from 0.4:1 to 0.8:1; and
   (e) from 0.2 to 5 phr of cobalt neodecanoate.

2. The article of claim 1 wherein said article is selected from the group consisting of a wire, plate, screen, beam, strip, nut, screw and clip.

3. A zinc-rich coated steel wire encapsulated by a wirecoat compound, wherein said wirecoat compound comprises
   (a) 100 parts by weight of a rubber selected from the group consisting of natural rubber, synthetic rubber and mixtures thereof;
   (b) from 45 to 70 phr of carbon black;
   (c) from 0.5 to 3 phr of a sulfur donor selected from the group consisting of elemental sulfur, polymeric polysulfide, sulfur olefin adducts and mixtures thereof;
   (d) from 1.25 to 3.75 phr of at least one accelerator; wherein the weight ratio of sulfur donor to total accelerator present in the wirecoat ranges from 0.4:1 to 0.8:1; and
   (e) from 0.2 to 5 phr of cobalt neodecanoate.

4. The wire of claim 3 wherein said rubber is natural rubber.

5. The wire of claim 3 wherein said rubber is a blend of natural rubber and a synthetic rubber selected from the group consisting of cis-1,4-polyisoprene, polybutadiene, copolymers of isoprene and butadiene, copolymers of acrylonitrile and butadiene, copolymers of styrene, butadiene and isoprene, copolymers of styrene and butadiene and blends thereof.

6. The wire of claim 3 wherein said rubber comprises a blend of natural rubber and a synthetic rubber and said natural rubber is present in an amount ranging from 5 to 95 weight percent of the total rubber present in the compound.

7. The wire of claim 3 wherein from 50 to 65 phr of carbon black is present.

8. The wire of claim 3 wherein said carbon black is selected from the group consisting of N326, N330, N347, N550, 630, N642, N660, N754, N762, N765 and N990.

9. The wire of claim 3 wherein said carbon black is selected from the group consisting of N326, N347 and N550.

10. The wire of claim 3 wherein said sulfur donor is elemental sulfur.

11. The wire of claim 3 wherein said sulfur donor is present in an amount ranging from about 0.75 to 1.5 phr.

12. The wire of claim 3 wherein said accelerator is selected from the group consisting of sulfenimides, sulfenamides, amine disulfides, guanidines, thioureas, thiazoles, thiurams, dithiocarbamates, xanthates and mixtures thereof.

13. The wire of claim 3 wherein said sulfenimide is N-t-butyl-2-benzothiazole sulfenimide.

14. The wire of claim 12 wherein said sulfenamide is of the general formula:

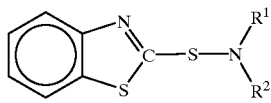

wherein $R^1$ is selected from the group consisting of hydrogen, acyclic aliphatic groups having from about 1 to 10 carbon atoms, and cyclic aliphatic groups having from about 5 to 10 carbon atoms; and $R^2$ is selected from the group consisting of cyclic aliphatic groups having from about 5 to 10 carbon atoms and a mercaptobenzothiazolyl group of the formula:

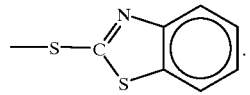

15. The wire of claim 14 wherein said sulfenamide is selected from the group consisting of N-cyclohexyl-2-benzothiazylsulfenamide, N-isopropyl-2-benzothiazylsulfenamide, N-t-butyl-2-benzothiazyl-sulfenamide, N-t-butyl bis-(2-benzothiazylsulfen)amide and N,N-dicyclohexyl-2-benzothiazylsulfenamide.

16. The wire of claim 3 wherein the weight ratio of sulfur donor to total accelerator present in said wirecoat ranges from 0.42:1 to 0.72:1.

17. The wire of claim 3 wherein a methylene acceptor is present.

18. The wire of claim 3 wherein a methylene donor is present.

19. The wire of claim 18 wherein said methylene donor is selected from the group consisting of hexamethylenetetramine, hexaethoxymethylmelamine, hexamethoxymethylmelamine, lauryloxymethylpyridinium chloride, ethoxymethylpyridinium chloride, trioxan hexamethoxymethylmelamine polymers of formaldehyde, hexakis-(methoxymethyl)melamine, N,N',N"-trimethyl/N,N',N"-trimethylolmelamine, hexamethylolmelamine, N-methylolmelamine, N,N'-dimethylolmelamine, N,N',N"-tris(methoxymethyl)melamine and N,N',N"-tributyl-N,N', N"-trimethylol-melamine.

20. The wire of claim 17 wherein said methylene acceptor is selected from the group consisting of resorcinol, activated phenols by ring substitution and cashew nut oil modified novalak-type phenolic resin.

21. The wire of claim 20 wherein said activated phenol is selected from the group consisting of resorcinol, cresols, t-butyl phenols, isopropyl phenols, alkyl phenols and mixtures thereof.

22. The wire of claim 3 wherein said wirecoat additionally contains a cobalt compound.

23. The wire of claim 22 wherein said cobalt compound is present in an amount ranging from 0.2 to 5 phr.

24. The wire of claim 22 wherein said cobalt compound is selected from the group consisting of cobalt salts of fatty acids, cobalt salts of aliphatic or alicyclic carboxylic acids having from 6 to 30 carbon atoms, cobalt chloride, cobalt naphthenate, cobalt carboxylate and organocobalt-boron complexes.

25. The wire of claim 24 wherein said cobalt compound is selected from the group consisting of cobalt neodecanoate and cobalt naphthenate.

26. The wire of claim 3 wherein the radially outermost layer contains a zinc weight percentage ranging from 85 to 100 percent by weight.

27. The wire of claim 3 wherein the zinc weight percentage ranges from 92 to 100 percent by weight.

28. The wire of claim 3 which is formed into a cord that is selected from the group of cord constructions selected from the group consisting of 2x, 3x, 4x, 5x, 6x, 7x, 8x, 11x, 12x, 27x, 1+2, 1+3, 1+4, 1+5, 1+6, 1+7, 1+8, 1+14, 1+15, 1+16, 1+17, 1+18, 1+19, 1+20, 1+26, 2+1, 2+2, 2+5, 2+6, 2+7, 2+8, 2+9, 2+10, 2/2, 2/3, 2/4, 2/5, 2/6, 3+1, 3+2, 3+3, 3+4, 3x4, 3+6, 3x7, 3+9, 3/9, 3+9+15, 4x4, 5/8/14, 7x2, 7x3, 7x4, 7x7, 7x12, 7x19, 5+1, 6+1, 7+1, 8+1, 11+1, 12+1, 2+7+1, 1+4+1, 1+5+1, 1+6+1, 1+7+1, 1+8+1, 1+14+1, 1+15+1, 1+16+1, 1+17+1, 1+18+1, 1+19+1, 1+20+1, 2+2+8, 2+6+1, 2+7+1, 2+8+1, 2+9+1, 2+10+1, 2+2+8+1, 3+9+15+1, 27+1, 1+26+1, 7x2+1, 3+9+1, 3/9+1, 7x12+1 and 7x19+1.

29. The wire of claim 28 wherein the cord construction is selected from the group consisting of 2x, 3x, 1+5, 1+6, 1+18, 2+7 and 3/9+1.

30. The wire of claim 3 in which the diameter of the wire ranges from about 0.08 to 0.5 mm.

31. The wire of claim 3 in which the diameter of the wire ranges from about 0.15 to 0.35 mm.

32. A pneumatic tire having a wire of claim 3 incorporated therein.

33. A pneumatic tire having a cord of claim 28 incorporated therein.

* * * * *